United States Patent
Ponnavaikko et al.

(10) Patent No.: US 10,671,973 B2
(45) Date of Patent: Jun. 2, 2020

(54) SYSTEMS AND METHODS FOR AUTOMATIC PROCESSING OF FORMS USING AUGMENTED REALITY

(71) Applicant: Xerox Corporation, Norwalk, CT (US)

(72) Inventors: Kovendhan Ponnavaikko, Tamil Nadu (IN); Nischal M Piratla, Hyderabad (IN); Sivasubramanian Kandaswamy, Chennai (IN); Anuradha Rukmangathan, Thiruninravur (IN); Raja Srinivasan, Pin (IN)

(73) Assignee: XEROX CORPORATION, Norwalk, CT (US)

( * ) Notice: Subject to any disclaimer, the term of this patent is extended or adjusted under 35 U.S.C. 154(b) by 1055 days.

(21) Appl. No.: 13/733,171

(22) Filed: Jan. 3, 2013

(65) Prior Publication Data

US 2014/0188756 A1 Jul. 3, 2014

(51) Int. Cl.
*G06Q 10/10* (2012.01)
*G06K 9/00* (2006.01)
*H04M 15/00* (2006.01)

(52) U.S. Cl.
CPC .......... *G06Q 10/10* (2013.01); *G06K 9/00449* (2013.01); *H04M 15/44* (2013.01); *H04M 15/70* (2013.01); *H04M 15/721* (2013.01)

(58) Field of Classification Search
CPC ............. G06Q 20/042; G06Q 20/0245; G06Q 20/3223
See application file for complete search history.

(56) References Cited

U.S. PATENT DOCUMENTS

| | | | |
|---|---|---|---|
| 6,782,144 B2* | 8/2004 | Bellavita et al. | 382/310 |
| 7,735,721 B1* | 6/2010 | Ma | G06Q 20/042 235/379 |
| 8,542,906 B1* | 9/2013 | Persson | G06K 9/00671 382/103 |
| 8,811,711 B2* | 8/2014 | Calman et al. | 382/138 |
| 2002/0165877 A1* | 11/2002 | Malcolm | G06Q 30/02 715/223 |
| 2006/0242063 A1* | 10/2006 | Peterson et al. | 705/42 |

OTHER PUBLICATIONS

Brandon Widder, Best Augmented Reality Apps, Mar. 14, 2014.*
Devindra Hardawar, Augmented reality expert explains how AR will help humanity, Sep. 15, 2015.*
See Elon Musk's Real-Life 'Iron Man' Lab.*
U.S. Appl. No. 13/559,630, filed Jul. 27, 2012; Ponnavaikko et al, "Method and System for Automatically Checking Completeness and Correctness of Application Forms".

* cited by examiner

*Primary Examiner* — Aryan E Weisenfeld
(74) *Attorney, Agent, or Firm* — Jones Robb, PLLC (57) ABSTRACT

The present disclosure discloses a method for automatic processing of forms using augmented reality. In an embodiment, a filled-out application form including one or more fields is scanned in augmented reality mode and its one or more images are captured. The captured images are used to identify the form type by comparing them with an original application form and to generate an electronic version of the form. Subsequently, filled-out content in the images is extracted and compared with a retrieved configuration file, which has a type same as the identified type of the filled-out application form. Based on this comparison, one or more messages are generated that are superimposed on the electronic version of the form in the augmented reality mode and that both are displayed.

16 Claims, 8 Drawing Sheets

ACCOUNT OPENING FORM
FOR RESIDENT INDIVIDUALS
(To be filled by applicant only)

We understand your worl

Please open my ☐ Savings/ ☐ Savings/Salary Account/ ☐ Current Account at your _____________ Branch
(Please fill the form In BLOCK LETTERS only - All Fields marked (*) are MANDATORY)     *Application Date [D][D] [M][M] [Y][Y][Y][Y]

**(A) *PERSONAL DETAILS (THIS IS A MACHINE READABLE FORM AND WILL PASS THROUGH A SCANNER)**

APPL  PREFIX  FULL NAME (Please leave one space between words for e.g.)  [A][J][A][Y]  [R][A][M]  [M][I][S][H][R][A]
1st
2nd
3rd
If you are an exsisting customer please move directly to section "C"

*NAME TO BE DISPLAYED ON ATM/DEBIT CARD/CORRESPONDENCE     *DATE OF BIRTH     *Male/Female     — 204
1st Appl.                                                  1st Appl. [D][D] [M][M] [Y][Y][Y][Y]   Ⓜ Ⓕ
2nd Appl.                                                  2nd Appl. [D][D] [M][M] [Y][Y][Y][Y]   Ⓜ Ⓕ
3rd Appl.                                                  3rd Appl. [D][D] [M][M] [Y][Y][Y][Y]   Ⓜ Ⓕ

(B) *PAN No. (If not available please attach Form 60/61)  FORM 60 / 61 ATTACHED       *MOTHER'S MAIDEN NAME
1st Appl.                                         [Y] [N]   Ms.
2nd Appl.                                         [Y] [N]   Ms.
3rd Appl.                                         [Y] [N]   Ms.

In case the applicant is a minor, please write parent/guardian's name (as an applicant) below the minor's name.
MAILING ADDRESS:     For exsisting customers, address given below will be updated for the primary applicant in all amounts held with the bank
*Company Name/Flat No &
 Bldg Name
*Road No/Name
*Landmark
*City
*State                                                *Pin Code
                                                      Country
*Tel (0)                 EXT. No        STD Code              *Tel (R)
Mobile No.                      Email ID Please note - Welcome kit will be delivered to the address only — 202

(C) If any of the applicants are EXISTING ACCOUNT HOLDERS, Please mention the Customer IIdentification No.
1st Appl. Cust. ID            2nd Appl. Cust. ID            3rd Appl. Cust. ID

(D) INTRODUCTION DETAILS HDFC BANK Customer (Introducer's) Name

ACCOUNT NO.                          CUSTOMER ID.
I confirm that I am an account holder with HDFC Bank Ltd. for over 6 months. I confirm that I personaly know the applicants detailed above for more than
6months and confirm his/her identity, occupation and address.     Attach copy of any one:              FOR BANK USE:
Date: _____________                                  ☐ PAN Card      ☐ Passport              ☐ Yes
                                                     ☐ Election ID CArd/Ration Card/Driving License**
Signature: _____________                             **Accompanied by cheque signed by you NOMINATION  ☐ Yes   *Name of nominee
PAYMENT DETAILS  ☐ No, I declaire that I do not wish to make a nomination in my saving account — 206
Amount Rs.              pd.         ☐ Cash (To open an account with cash, the customer must deposit the cash, in person, only at the account branch)
☐ Cheque No.              Dated             Drawn on_______________ Bank, _______________ Branch
The cheque should be crossed A/e Payee and drawn payable to "HDFC Bank Ltd. A/e _______________ (Customer Name)*
Account Operating Instructions
☐ Single  ☐ Either/Any one or Survivor  ☐ Jointly (Debit/ATM card will not be issued)
Please Note: Cheque book of 10 leaves & 50 leaves will be issued to Savings and Current a/c holders respectively by default.

BELOW FIELDS ARE MANDATORY             ☐F ☐P ☐N
ACCOUNT NO                              CUSTOMER ID
Name:  PREFIX   FULL NAME
1st Appl.
PERMANENT ADDRESS
*Company Name/
 Flat No & Bldg Name
* Road No./Name
*Landmark
*City                                           *PIN Code
*State                                           County

ORIGINAL APPLICATION FORM PAGE 1

*FIG. 2A*

ATM CARD / DEBIT CARD

To apply for an HDFC Bank/Debit Card, please tick your choice:

| | ATM CARD | EASYSHOP DEBIT CARD* | |
|---|---|---|---|
| | | Regular | Gold |
| 1st Appl. | | | |
| 2nd Appl. | | | |
| 3rd Appl. | | | |

ATM/Debit Card No.
- 1st Applicant
- 2nd Applicant
- 3rd Applicant

EMAIL STATEMENT REGISTRATION ☐

NETBANKING REGISTRATION

*Email ID: (Write in BLOCK LETTERS only for e.g.) A J A Y R M I S H R A G A B C . C O . I N
- 1st Appl. ☐
- 2nd Appl.
- 3rd Appl.

INSTAQUERY & INSTAALERT REGISTRATION

Mobile Number | Name Of Co.
- 1st Appl.
- 2nd Appl.
- 3rd Appl.

The Average Quarterly Balance (AQB) required to be maintained for this account is Rs. ☐☐☐☐☐

DECLARATION

| Please Paste PHOTO of 1st Applicant | Please Paste PHOTO of 2nd Applicant | Please Paste PHOTO of 3rd Applicant |
|---|---|---|

| Sign Here | Sign Here | Sign Here |
|---|---|---|

*I/We ☐ Consent ☐

Name_______ Date_______ Name_______ Date_______ Name_______ Date_______

For Bank Use Only: A/C No. ☐☐☐☐☐☐☐☐☐☐☐☐☐ CUSTOMER ID NO. ☐☐☐☐☐☐☐☐

For Branch Use:
Br code where a/c is to be opened: ☐☐☐☐ Product Code: ☐☐☐ LC Code: ☐☐☐☐☐☐ LG Code: ☐☐☐☐☐☐

Company Code: ☐☐☐☐☐ Service Branch Code: ☐☐☐☐ Service ID Empl Code ☐☐☐☐☐☐ PromoCode: ☐☐☐☐☐☐☐☐☐☐☐

*For Defense Accounts only

| | VALUE DATE | FUNDS PARKED | PB SIGNATURE | DATE | CPU USE ONLY | DATE |
|---|---|---|---|---|---|---|
| ☐ No cheque book to be issued ☐ PAP cheque book ☐ CPV required ☐ | Date Month Year | UDN ☐☐☐☐☐☐☐☐☐☐ | APPROVED BY (BM) | | DVU FCU | |
| | | | SOURCING BR CODE | | | |

Occupation
If salaried employed with

Self Employed since ___ Years ___ Months
Nature of Balances
Date of Incorporation
Type of Company/
Self Employed Professional Source of Funds
Gross Annual Income

ABOVE FIELDS ARE MANDATORY

ORIGINAL APPLICATION FORM PAGE 2

*FIG. 2B*

FILLED-OUT CONTENT

MR KANNADA APPLICANT

218

KANNADA APPLICANT        10101980        ✓

234567890        ✓        APPLICANTS MA

1234 ABCD STREET

EFGH
IJKL
2345678

INTRODUCER
987654321

~~Introducer~~        ✓

220

EXTRACTED FILLED-OUT CONTENT

*FIG. 2D*

EXEMPLARY CONFIGURATION FILE

SYSTEMS AND METHODS FOR AUTOMATIC PROCESSING OF FORMS USING AUGMENTED REALITY

CROSS-REFERENCE TO RELATED APPLICATION(S)

The present disclosure relates to U.S. patent application Ser. No. 13/359,510, filed Jan. 27, 2012, and Ser. No. 13/559,630, filed Jul. 27, 2012, which is incorporated herein in its entirety by this reference.

TECHNICAL FIELD

The presently disclosed embodiments generally relate to application forms for various business services, and more particularly, to systems and methods for automatically validating application forms.

BACKGROUND

Business services, such as banking, telecom or postal play a significant role in the day-to-day life of individuals. To access these services, customers typically provide information using one or more application forms, which may vary from service-to-service. For example, if a customer wishes to open-up a new bank account, the customer provides information on an account opening form. Similarly, a customer may complete a loan application form if applying for a loan.

In order to subscribe for banking services, a customer may need to provide information on an application form, usually at a bank branch, and submit the completed or partially completed form to a bank representative. The branch representative then typically manually checks the application form to verify whether the application form is filled-out completely and correctly. Based on this document review, the customer may need to correct errors or provide additional information so that the application is sufficiently completed. Thereafter, the bank representative typically again verifies the application form focusing on the corrected entries. Subsequently, the application form is forward, for example, by courier to a central location or back-office for further verification and processing. At the back-office, the forms undergo a complete verification, including checking supporting documents, such as a PAN (Personal Account Number) card, driver's license, or the like. If the forms are found to be incomplete or if the supporting documents are unavailable, the forms are returned to the customer in order to obtain the missing information or documents. This process continues until the application form is appropriately or sufficiently complete along with the supporting documents.

The above approach may involve significant manual effort in reviewing the forms, thereby unnecessarily increasing form processing time. In one scenario, a bank representative, who is visiting a customer intending to open a new bank account, is unable to check the completeness and correctness of an application form filled-out by the customer at the customer's location. Thus, the bank representative sends the application form to the back-office for processing the form. This results in increased operational cost as well as reduced customer satisfaction. Accordingly, a significant cost, both in terms of time and resources, is spent on checking forms completed at the customer's location and at the back-office. It may, therefore, be advantageous to enhance the efficiency of the above process for processing forms.

SUMMARY

The present disclosure discloses a system for automatic processing of application forms that include one or more fields. In an embodiment, the system includes an imaging unit, processing unit, and a user interface. The imaging unit is configured to scan at least a portion of the filled-out application form in augmented reality mode and capture one or more images based on this scanning. The processing unit is configured to compare the captured images with an original application form for identifying a type of the filled-out application form. The processing unit is also configured to generate an electronic version of the filled-out application form using the captured one or more images. Further, the processing unit extracts the filled-out content in the fields of the captured one or more images and retrieves a configuration file based on the identified type of filled-out application form. The configuration file includes rules and threshold values for each of the fields in the application form. Subsequently, the extracted content is compared with at least one of the rules and the threshold values in the configuration file to generate one or more messages. The user interface is configured to display either the generated messages only or the electronic version of the filled-out application form superimposed with these generated messages in the augmented reality mode.

Other and further aspects and features of the disclosure will be evident from reading the following detailed description of the embodiments, which are intended to illustrate, not limit, the present disclosure.

DETAILED DESCRIPTION

The following detailed description is made with reference to the figures. Exemplary and in some cases preferred embodiments are described to illustrate the disclosure, not to limit its scope, which is defined by the claims. Those of ordinary skill in the art will recognize a number of equivalent variations in the description that follows.

Definitions:

In various embodiments of the present disclosure, definitions of one or more terms that will be used in the document are described below. The disclosure includes a device that facilitates the automation of various types of operations usually performed in a business center, such as bank branch, telecom center, postal office, or the like. However, not all embodiments focus on the above contexts, and in fact, some embodiments are applied in contexts that are unrelated to the above. One exemplary device automates the processing of an application form at the customer's location. As is discussed in detail below, the device performs automation by executing a number of steps. These steps include scanning and capturing of a filled-out or partially filled out application form in augmented reality mode, extraction of the filled out content, analysis of the extracted content and form fields, and displaying messages based on this analysis using augmented reality. Augmented reality refers to the technology that superimposes computer-generated information, such as images, text, etc., on a user's view of the real world to provide a composite view in real time.

The numerous references in the disclosure to filled out forms are intended to cover any and/or all data provided on or otherwise input onto any document relevant to the applicable context, regardless of whether or not the same or the date is provided. Thus, the following references to filled-out application forms cover forms that are filled out completely, as well as forms that are only partially completed. Furthermore, the device may be capable of receiving and displaying an electronic version of an application form.

Overview:

Some of the disclosed embodiments relate to handling application forms for various business services, such as banking, telecom, or postal services, which may use different application forms. For example, banking services have forms relating to opening a new account, changing personal information, applying for a loan and so forth.

Similarly, the application forms for telecom services may include buying a new connection, for example. Some embodiments of the disclosure automate processing of information filled-out on application forms at a location of a customer, and thus, this disclosure describes a device for processing the application forms using augmented reality at the customer end. More particularly, the device utilizes a configuration file to determine the completeness or correctness of application forms. The configuration file can include one or more rules and threshold values, based on which the device can verify the completeness or correctness of the application forms. Subsequently, the device can display one or more messages over an electronic version of the filled-out application form on a user-interface using augmented reality. Based on the displayed messages, a user can modify the 'physical' filled-out application form or an electronic version of the application form. Alternatively, the user can choose to ignore the messages.

EXEMPLARY EMBODIMENT

Figure 1A:
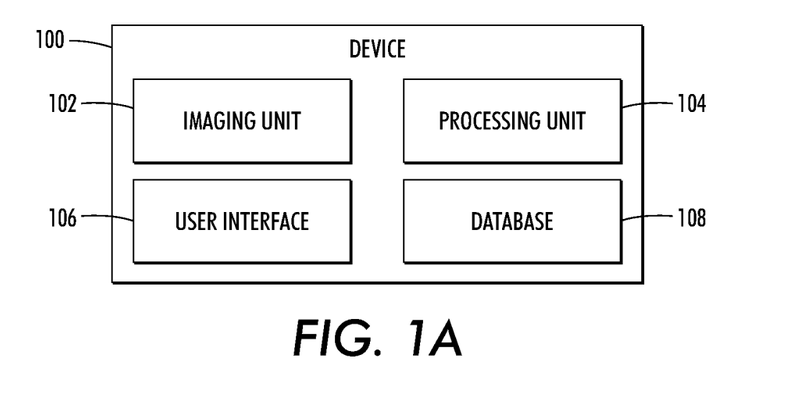
FIG. 1A illustrates an exemplary device for automatic processing of application forms in accordance with an embodiment of the disclosed subject matter.

FIG. 1A illustrates an exemplary device for automatic processing of application forms using augmented reality, according to the disclosure. The device 100 may be a portable device configured to perform a number of operations, which are performed in a business center or bank branch. Examples of the device 100 include, but are not limited to, a mobile phone, a scanner, a laptop, and a personal electronic assistant (PDA). According to one example, the device 100 may perform functions, without limitation, related to sending or receiving electronic version of application forms (hereinafter referred to as electronic application forms) and scanning of the physical application forms. The device 100 may allow a user to perform additional activities including paying bills, viewing account summary, viewing statements, viewing branch reports, uploading documents, downloading documents, and so on; however these extraneous functions do not need to be necessarily related to other aspects of the present disclosure, and in fact can be completely unrelated to the rest of the disclosure. For simplicity, this disclosure is described in the context of device 100 shown in FIG. 1A, however, embodiments are intended to cover or otherwise include other types and/or combinations of multiple portable devices, such as a camera and a scanner.

In one embodiment, the device 100 may be configured to operate in two modes, namely, a normal mode and an augmented reality mode. Unlike the normal mode, the device 100 can combine computer-generated information, such as annotations, messages, emoticons, etc., with received real-world data such as images, video, etc. to provide a composite view in the augmented reality mode. One of skill in the art will understand the concepts of augmented reality along with its implementation on the device 100. The device 100 can be, for e.g., a mobile phone (see FIG. 1C) having an imaging unit 102, a processing unit 104, a user interface 106, and a database 108. These components 102, 104, 106, and 108 communicate with each other, or may be configured to communicate with a computing device at another location, such as a back-office, over a network (not shown) using a variety of communication protocols, including related art, known, or even later developed methods and systems. It should be understood that the device 100 can also be any electronic device having the components 102, 104, 106 and 108, and is not limited to a mobile phone.

The imaging unit 102 may include a variety of components, such as a camera, microcontroller, etc., which are switched to operate in the augmented reality mode. In this mode, the imaging unit 102 may scan, e.g., a video scan, a physical filled-out application form including multiple fields, which may be filled-out. This scanning can capture one or more images of the filled-out application form, when, for e.g., the imaging unit 102 is triggered by a user or automatically while scanning as configured. These captured images may be a collection of scanned images of portions of the filled-out application form and/or the entire filled-out application form. One of skill in the art will understand that, for some embodiments, the filled-out application form has to be located at a reasonable distance from a scanning lens of the imaging unit 102 depending on factors, such as, focal length and resolution of the imaging unit 102, for capturing at least a standard quality image of the filled-out application form.

Further, the imaging unit 102 may include a focus zone for capturing images of the scanned application form. According to one example, the focus zone may be a pre-defined boundary on a portion of scanning lens (not shown) of the imaging unit 102, such that the imaging unit 102 captures a part of the filled-out application form when positioned within this pre-defined boundary. Alternatively, the complete scanning lens may operate as the focus zone of the imaging unit 102. This focus zone may be further used for identifying a type of the filled-out application form, as discussed below.

Still further, the processing unit 104 may be configured to identify a type of the filled-out application form by comparing the captured images of the application form (hereinafter referred to as captured application form) against an original application form. Once the form type is determined, the processing unit 104 may generate an electronic version of the filled-out application form (hereinafter referred to as electronic application form) using the captured application form. Then, the processing unit 104 extracts the filled-out content in each of the fields of the captured application form and retrieves a configuration file based on the identified type of the captured application form. The configuration file includes distinct rules and threshold values for each field of the captured application form in order to process the filled-out application form, discussed below in detail. For this task, the processing unit 104 compares the extracted content with the respective rules and threshold values defined in the retrieved corresponding configuration file to generate messages. These generated messages are displayed on the user interface 106.

The user interface 106, e.g., a display screen, may be configured to display the generated messages or the electronic application form. In one embodiment, the user interface 106 may be configured to display the messages over the electronic application form, while the device is operating in the augmented reality mode. Different types of user interfaces, including those, which are touch controlled, key-controlled, joystick-controlled, motion-controlled, voice-controlled, and so on may be employed. The user interface 106 may be either integrated or separately combined with the device 100.

Further, the device 100 can any type of database 108, such as a relational database management system (RDMS), or other known types of storage devices, such as EEPROM, flash memory, cache memory, SD-RAM, and DDR-RAM, or other known types of storage devices. In the above embodiment, the database 108 may store a variety of data such as a blank original application form, configuration files, log files, etc.

Figure 1B:
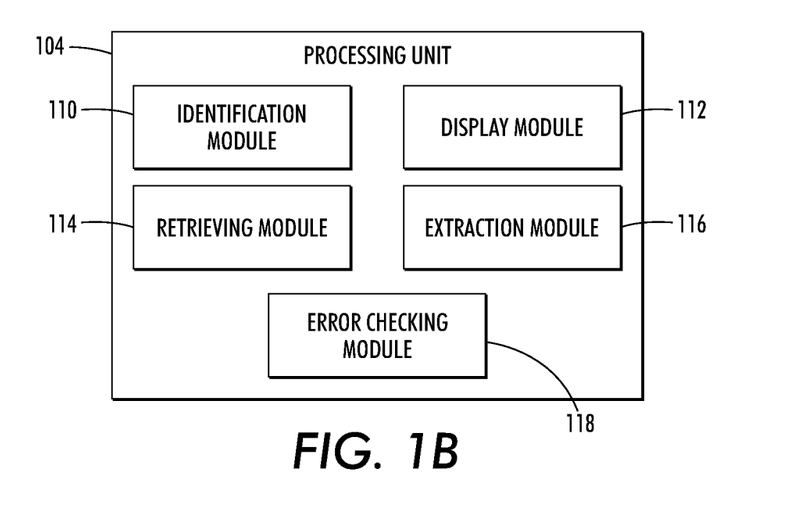
FIG. 1B illustrates an exemplary processing unit of the device of FIG. 1A in accordance with an embodiment of the disclosed subject matter.
Figure 1C:
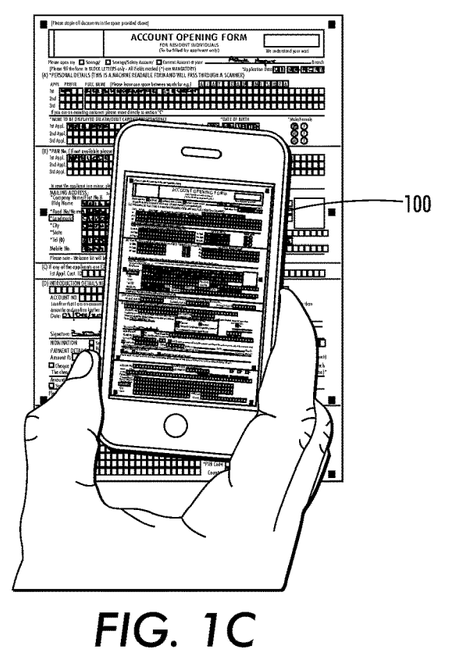
FIG. 1C illustrates scanning of an application form using the exemplary device of FIG. 1A.

FIG. 1B illustrates an exemplary processing unit 104 of the device of FIG. 1A, according to the disclosure. In one embodiment, the processing unit 104 includes an identification module 110, a display module 112, a retrieving module 114, an extraction module 116, and an error-checking module 118. The identification module 110 may be configured to identify a type of the filled-out application form. For this task, the identification module 110 parses and compares background information in the captured application form against an original application form stored in the database 108. The background information refers to any data including, but not limited to a logo, an application form number, a barcode, and a field header, for example, which are available on the captured application form except the filled-out content in the fields of the captured application form.

One of skill in the art will understand that, if multiple original application forms of different types are stored in the database 108, then the identification module 110 will compare background information of the captured application form against those in each of the original application forms for a best match, which indicates the type of the filled-out application form. Upon finding a best match, the identification module 110 may retrieve the type information, which may be stored as metadata with the corresponding original application form. The identification module 110 may be further identifying mandatory fields and optional fields in the captured application form based on the above comparison for extraction of the filled-out content, discussed below. In some embodiments, the identification module 110 may receive the application form type from a user via the user interface 106.

Once the type of filled-out application form is identified, the display module 112 may be configured to generate an electronic version of the entire filled-out application form using the captured images of the filled-out application form. This electronic version of the filled-out application form (hereinafter referred to as electronic application form) will include the content originally filled-out in the corresponding physical filled-out application form. Subsequently, the generated electronic application form is displayed on the user interface 106. In some embodiments, the display module 112 may generate this electronic version as editable (hereinafter referred to as editable application form). This editable application form may allow a user to edit the filled-out content via, e.g., user interfaces such as the user-interface 106.

Further, the retrieving module 114 may be configured to retrieve a configuration file from the database 108 based on the identified type of the filled-out application form. The configuration file includes threshold values and rules for each field of the captured application form. In one embodiment, the retrieving module 114 may feed the retrieved configuration file to the extraction module 116.

The extraction module 116 may be configured to separate the background information from the captured application form and extract only the content filled-out in the mandatory fields of the captured application form. For this task, the extraction module 116 may subtract the original application form from the captured application form of the type that is the same as that of the original application form. The extracted content is verified by the error-checking module 118 for completeness and correctness.

Figure 1D:
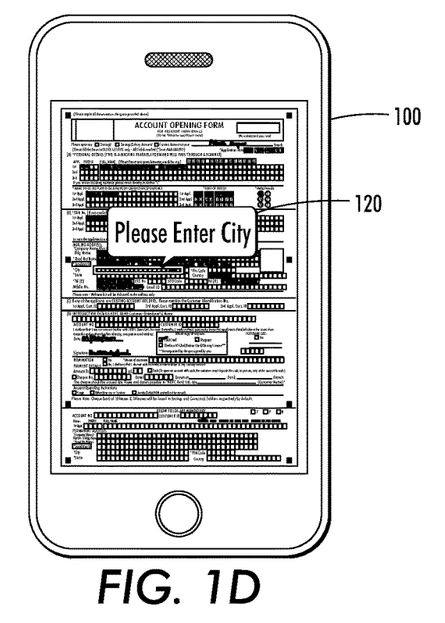
FIG. 1D illustrates messages displayed on the exemplary device of FIG. 1A.

The error-checking module 118 may be configured to calculate the average intensity, e.g., average optical intensity, of the extracted content, which was filled-out in any of the fields, and compare the extracted content with the corresponding threshold values stored in the configuration file. According to one example, when a value of '255' represents a blank or an all white field, and '0' depicts an all black field, if the intensity of the extracted content is above a threshold value, such as '150', then the error-checking module 118 may consider the filled-out content as complete as opposed to incomplete. According to the illustrated example of FIG. 1D, when the mandatory field 'City' is empty and the average intensity of the field is below the threshold value, such as '150', then the error-checking module 118 generates an error message 120 over the electronic application form in the augmented reality mode.

Further, the error-checking module 118 may be configured to determine the correctness of the filled-out application form. For this task, the error-checking module 118 may apply one or more rules predefined in the configuration file to the content filled-out in the captured application form. For example, the error-checking module 118 may apply a rule to determine whether the checkboxes for "Married" and "Unmarried" are both filled-out. If both the checkboxes are filled-out, this means that the content is filled-out incorrectly. In such a scenario, the error-checking module 118 generates a robust error message, which may indicate that the user should or needs to fill-out a new 'physical' application form and repeat the entire process as discussed above.

Another example of a rule that may be defined is "If there is more than one applicant, then there must be more than one full name". If the rule violated, then the error-checking module 118 may again generate an error message. These error messages are displayed on the user interface 106 superimposed on the electronic application form against the field for which the error message has been generated, provided the device 100 is operating in the augmented reality mode (shown in FIG. 1D). Alternatively, only the error messages may be displayed without displaying the electronic application form.

Based on these error messages, the user may determine whether the filled-out content of the captured application form should be modified or the messages should be ignored. For this task, the user interface 106 may be configured to allow the user to modify the content of the electronic application form. For instance, if the error-checking module 118 prompts the user with an error message indicating that the field "Date of Birth" is missing, then the user may fill-out the field on the same physical copy of the filled-out application form or a new physical copy of the application form, and re-scan the filled-out application form for processing. Alternatively, the user may fill-out the field 'Date of Birth' in the editable application form displayed on the user interface 106 and conduct a re-check for completeness and correctness on this editable application form.

The iteration of the captured application form from the identification module 110 to the error-checking module 118 may be repeated until the filled-out application form meets the criteria defined in the configuration file. These criteria refer to the completeness and correctness of the mandatory fields in the filled-out application form as required by, or otherwise helpful to, a business service provider. Once the processing unit 104 has completed the checking of the captured application form, a log file along with the corrected filled-out content from each field (i.e., in case of electronic application form) may be stored within the database 108. The log file may be used as a reference to verify and ensure the correctness and completeness of the filled-out application form, whenever helpful or required. In some embodiments, the log file may be sent over to a distant location, such as a back office, via a network and a network module (not shown), which may be included in the device 100, for a variety of operations, such as re-checking of the filled-out application forms, data entry operations, third party validations, etc. Examples of applicable networks include, but not limited to, Local Area Network (LAN), Wide Area Network (WAN), a Metropolitan Area Network (MAN), Wireless LAN, and so on.

Figure 2A:
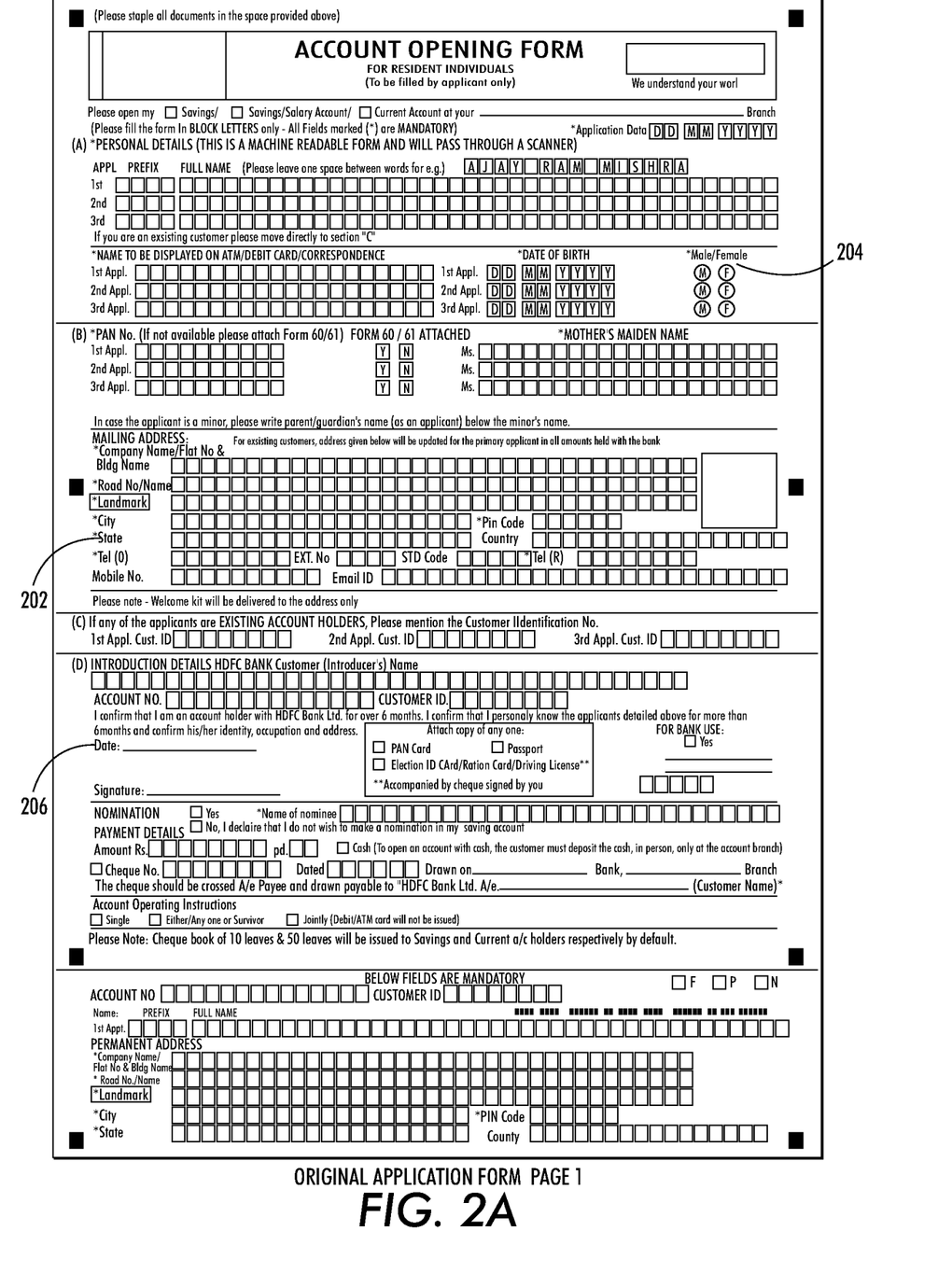
FIGS. 2A-2B, 2C, and 2D illustrate examples of an original application form, a filled-out form, and extracted filled-out content, respectively, according to one embodiment of the disclosed subject matter.
Figure 2B:
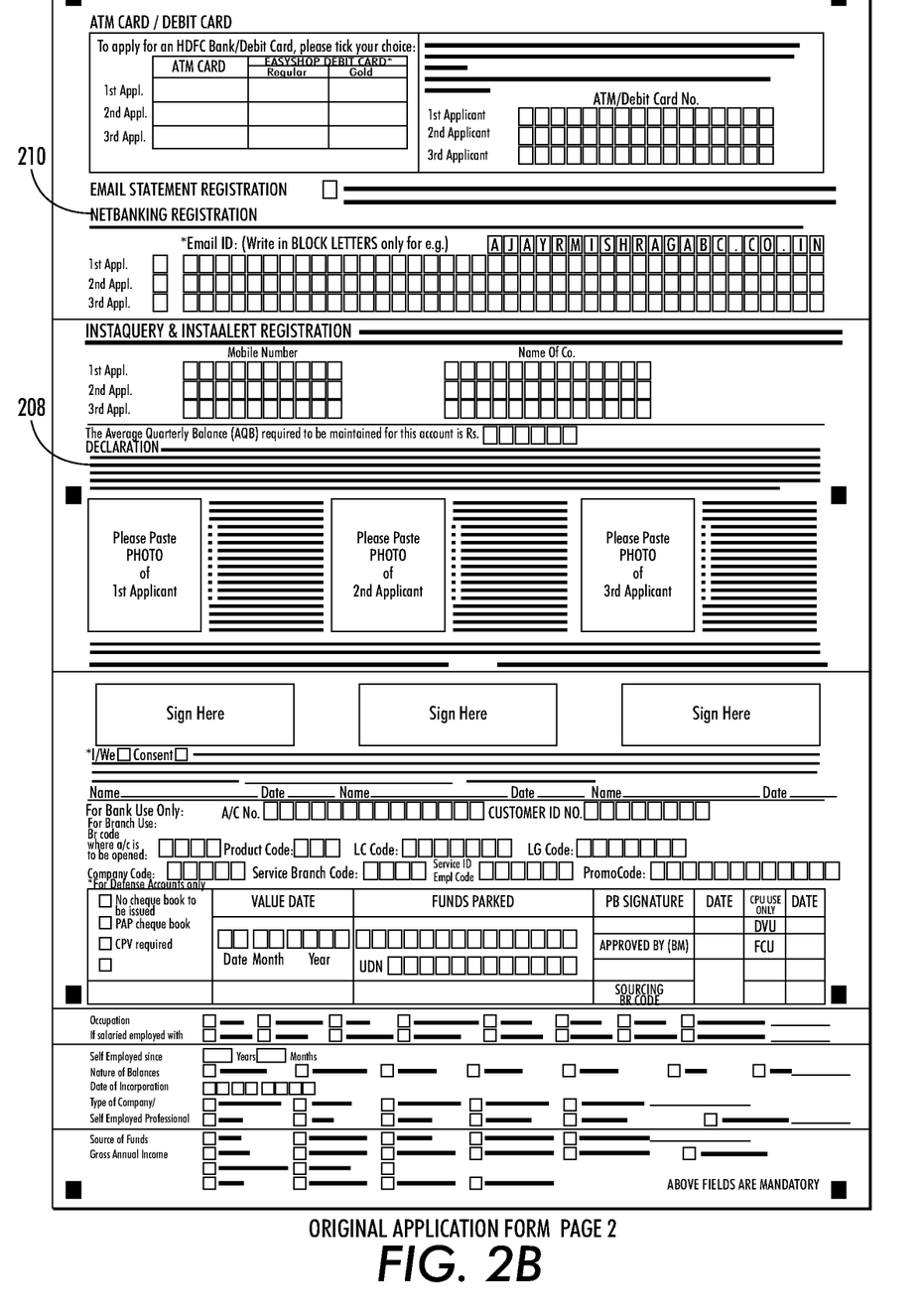
Figure 2C:
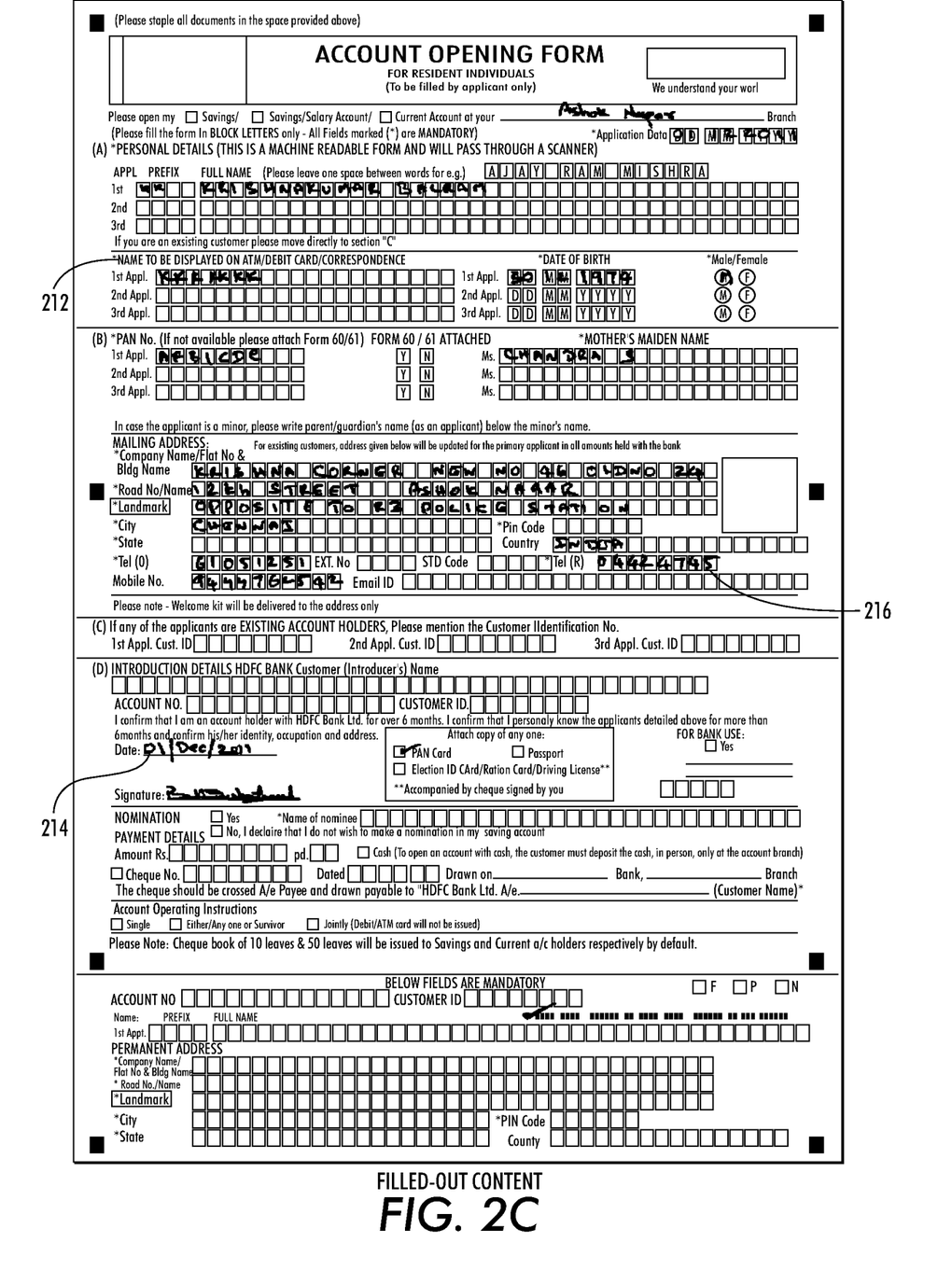

Exemplary Application Forms:

FIGS. 2A-2B illustrate a 2-page original, blank application form. In general, the application form includes various fields, such as, "First Name", "Last Name", "Age", "Permanent Address", "Date of Birth", "Contact Number", or "Email Id". Some of the fields such as, "State", "Male/Female", "Date", "Net Banking Registration", "Declaration" are marked as 202, 204, 206, 210, and 208, respectively, in FIGS. 2A-2B. These fields constitute background information relating to a customer and blank versions of these forms are stored in the database 108 of the device 100. A form filled-out by a customer is shown in FIG. 2C, and some of the filled-out fields are "Name" 212, "Date" 214, and "Telephone" 216.

Figure 2D:
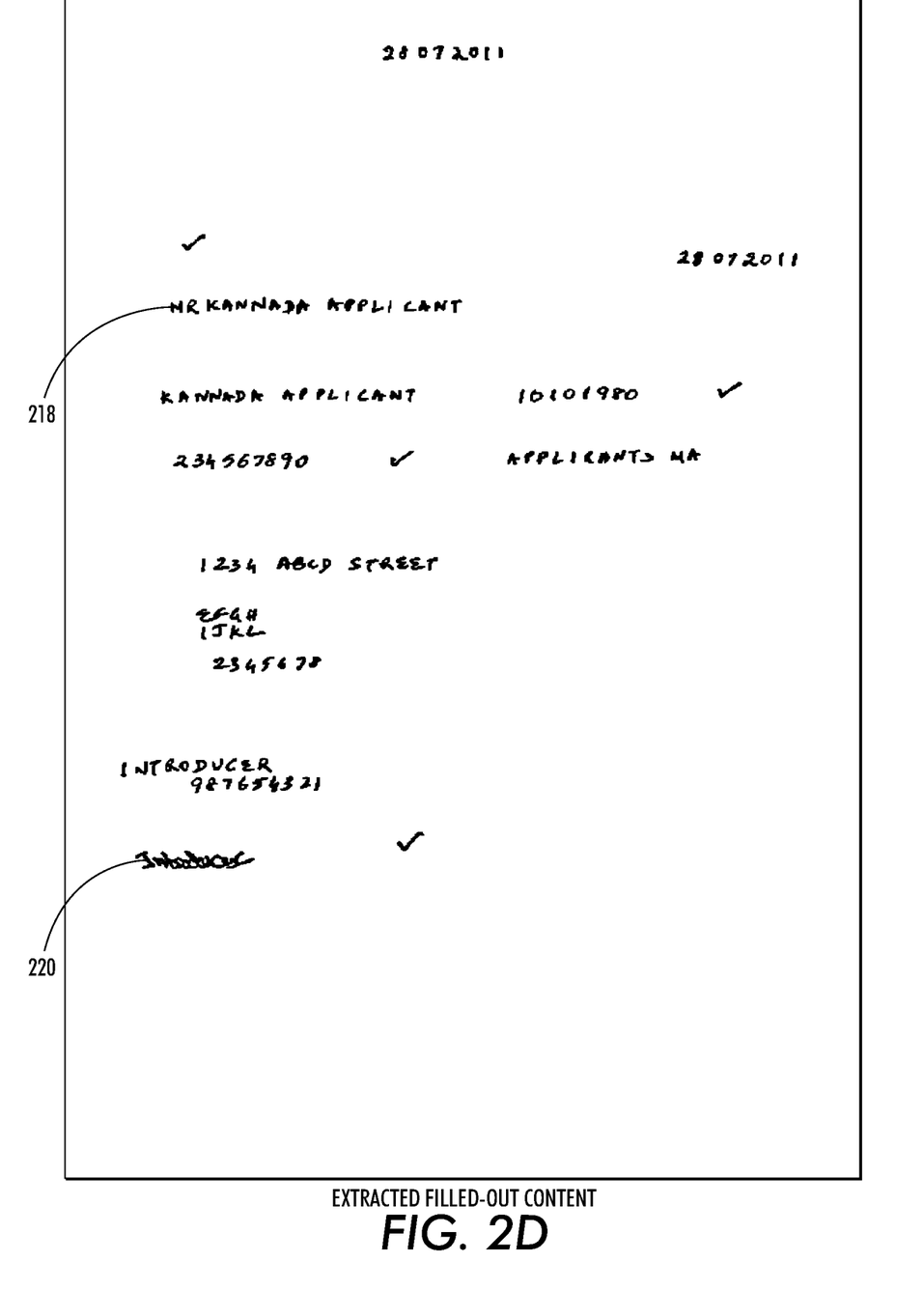

Referring to FIG. 2D, the filled-out content may be extracted by the device 100, which is illustrated as extracted content 218 and 220. The blank application form (in FIGS. 2A-2B), filled-out application form (in FIG. 2C), and extracted content (in FIG. 2D) are merely provided for exemplary purposes, and are not intended to limit the scope of the disclosure in any way.

Figure 3:
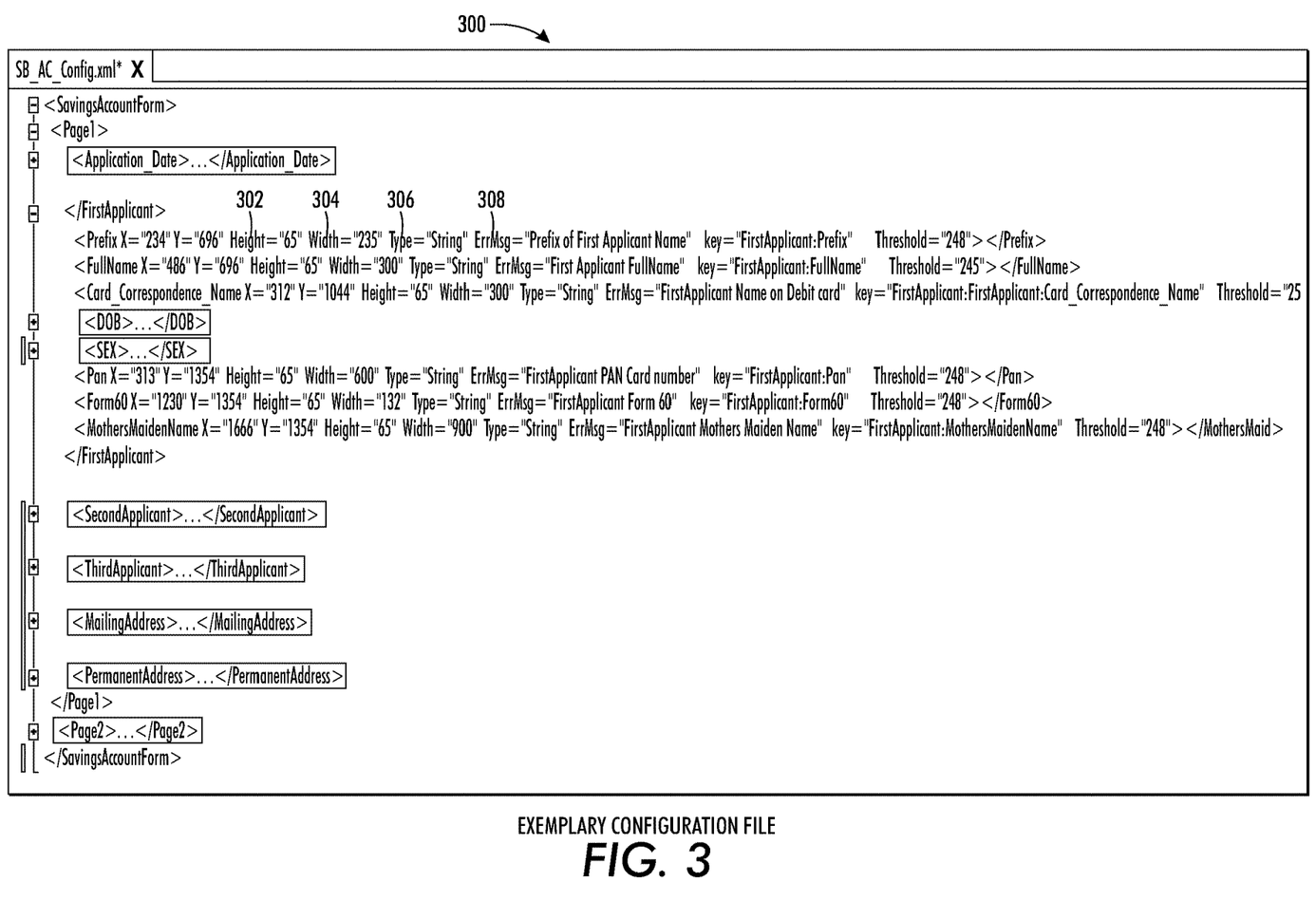
FIG. 3 is an exemplary configuration file according to the disclosed subject matter.

Exemplary Configuration File:

For each type of application form, a corresponding configuration file may be pre-defined in any known format, such as XML (EXtensible Markup Language) as illustrated in the embodiment of FIG. 3, or alternately in any other related art or later developed format. The configuration file may be a metadata file that stores all fields of an application form, along with related attributes, such as name, number of characters allowed for the field, and so on. Given a new filled-out application form, information about different fields is extracted and stored in the form of an XML document in the database 108. One such exemplary file 300 is shown in FIG. 3. The configuration file 300 may include various attributes, threshold values, or rules for each field in the form, and can be maintained in a pre-defined representation. For example, the "First Applicant" field in the application form may be denoted by <FullName> within the <FirstApplicant> tag in the configuration file 300. The <FirstApplicant> tag may further have child tags pertaining to "Date of Birth", "Gender", "PAN", or the like. The child tags denote the details related to the "First Applicant".

In one example, the attributes may include, but are not limited to, "X", "Y", "height", "width", "type", "errmsg", "key", and "threshold". Some of these attributes including "height", "width", "type", "errmsg" are marked as 302, 304, 306, and 308 respectively. Herein, "X", "Y" are the starting and ending positions of a field in an unfilled application form. The attributes "height" and "width" represent the height and width values of the particular field in the unfilled application form. The "type" attribute may define the data type of the field. For example, the field "Full Name" is a string type, while the field "Phone Number" is a number data type. Moreover, the field "Address" may be alphanumeric.

The attribute "ErrMsg" refers to an error message to be displayed in the case of an incorrect or incomplete entry against any field in the filled-out application form. The error message may be prompted when a validation error is captured while processing the filled-out application form. "Key" here represents a unique identity for the definition tag. Additionally, "threshold" represents the average pixel intensity for a particular field and is used as one of the criteria to determine the completeness check of the content. The "threshold" values may range from '0' to '255'; the value '0' here represents all black pixels, while '255' indicates all white pixels. Alternatively, the value '0' may denote all white pixels, and '255' may represent all black pixels. In the present embodiment, the threshold '245', for example, means that at least 4% of the box must have black pixels for the field to be considered filled. If the content intensity level is less than the threshold value, for e.g., '245', i.e., the number of black pixels do not exceed the threshold value, the field is considered to be filled-out not filled. Other attributes may be based on, but are not limited to, whether a particular field is mandatory, mutually exclusive to another field, optional, and so on.

Further, the configuration file 300 includes one or more rules to determine the correctness of the field in the form. In one example, the rule may be that the check boxes for married or unmarried cannot both be filled-out. The configuration file 300 also stores relationship data between different fields. An example for a relationship between fields is that, if a 'Second Applicant Name' has been provided, then details associated with the second applicant, such as 'Second Application Address', 'PAN Card Number', etc., must also be provided.

The configuration file 300 varies with the type of application form. For example, the configuration file 300 for "Savings Account Form" may be different from the configuration file 300 for the "Loan Application Form", accordingly, the attributes or threshold values may differ. The configuration file 300 may thus be customized to satisfy or otherwise address factors or requirements.

Figure 4:
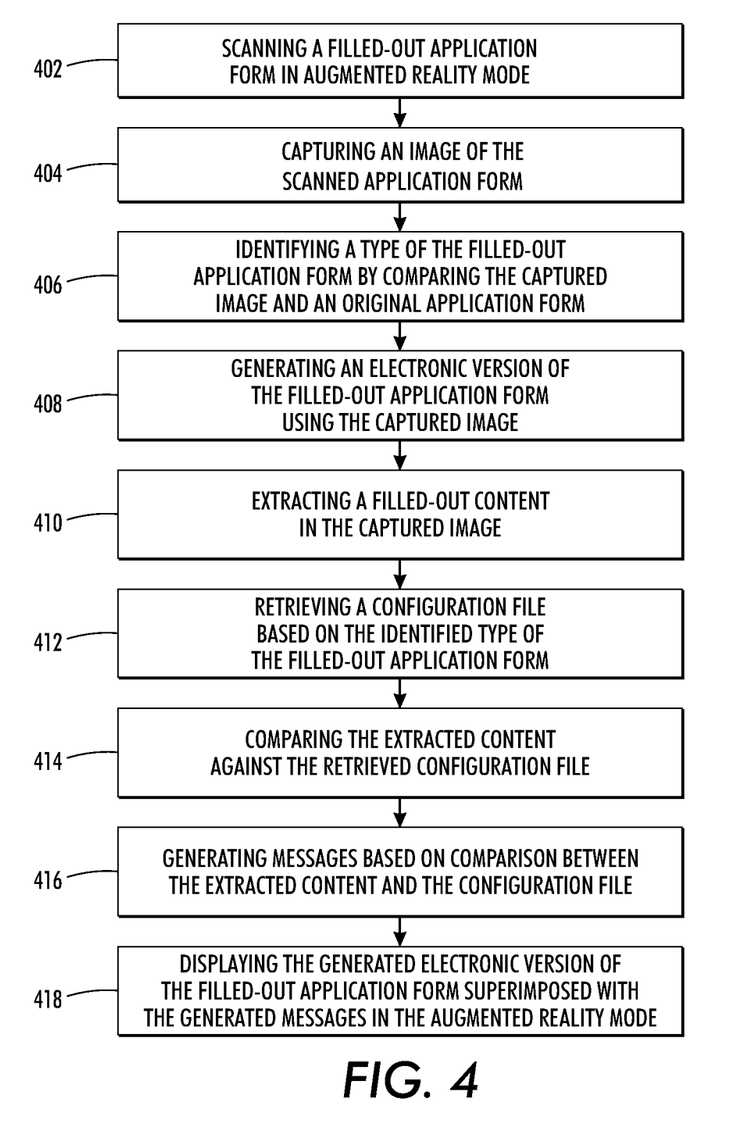
FIG. 4 is a flowchart of an exemplary method for automatic processing of application forms in accordance with the disclosed subject matter.

FIG. 4 illustrates a method for automatic processing of application forms using augmented reality, according to the disclosure. These exemplary methods may be described in the general context of computer executable instructions. Generally, computer executable instructions can include routines, programs, objects, components, data structures, procedures, modules, functions, and the like that perform particular functions or implement particular abstract data types. The computer executable instructions can be stored on a computer readable medium, and loaded or embedded in an appropriate device for execution.

The order in which the method is described is not intended to be construed as a limitation, and any number of the described method blocks can be combined or otherwise performed in any order to implement the method, or an alternate method. Additionally, individual blocks may be deleted from the method without departing from the spirit and scope of the subject matter described herein. Furthermore, the method can be implemented in any suitable hardware, software, firmware, or combination thereof, that exists in the related art or that is later developed.

The method describes, without limitation, implementation of the exemplary device 100 in a banking services scenario. One of skill in the art will understand that the method may be modified appropriately for implementation in a variety of business service scenarios including those related to telecom, postal services, and so on, without departing from the scope and spirit of the disclosure.

At step 402, a filled-out application form is scanned into the augmented reality mode. In the case of banking services, a customer may fill-out an application form for opening a new bank account. In this example, a bank representative may scan the filled-out application form at the customer site using the device 100 configured to operate in augmented reality mode. For this task, the device 100 may include the imaging unit 102, which the bank representative can hover over, or otherwise communicate with, the application form to scan various portions of filled-out application form while the device 100 is operating in the augmented reality mode.

At step 404, an image of the filled-out application form is captured. While scanning, either the device 100 automatically, or the bank representative can manually, capture multiple images of the filled-out application form. The captured images of the filled-out application form (i.e., the captured application form) are subjected to automatic processing for correctness and completeness.

At step 406, a type of the filled-out application form is identified. The background information available in the captured application form is compared with that in one or more original application forms, which may be blank and stored in the database 108. Upon having a best match with one of the original application forms based on such comparison, the type of the filled-out application form is determined. According to an example, the type formation may be stored in metadata of the original application forms and retrieved for form identification based upon the best match. Additionally, mandatory and optional fields in the captured application form may be identified based on this comparison.

At step 408, an electronic version of the captured application form (i.e., electronic application form) is generated. The display module 112 in the processing unit 104 generates the electronic application form by using the captured application form. The electronic application form includes the originally filled-out content recorded in the captured application form. In some embodiments, the generated electronic application form may be made to be editable such that a user can modify the originally filled-out content.

At step 410, the filled-out content in the captured application form is extracted. The filled-out content is extracted by subtracting the original application form, which is blank, from the captured application form. This original application form is the one previously identified to have the same type as that of the captured application form and is stored in the database 108.

At step 412, a configuration file is retrieved based on the identified type of the filled-out application form. Based on identified type of the captured application form, a configuration file, such as the configuration file 300, is retrieved from the database 108. The configuration file includes rules and threshold values for each field of the captured application form.

At step 414, the extracted filled-out content is compared with the configuration file. The extracted filled-out content from the captured application form may be compared with the rules and threshold values defined in the configuration file. According to one example, in order to check for completeness of a field, the average optical intensity of the extracted filled-out content can be compared with the corresponding threshold value defined for that field. If the intensity is above the threshold value, then the field is indicated as complete, or else it is indicated as incomplete. Similarly, in order to check for correctness, a rule may be applied to a field. For example, a rule defined as "Gender can be only male or female" may be applied to a field 'Gender'. If the average intensity of the filled-out content in the field 'Gender' is less than a respective range of threshold values for 'male' or 'female', the field 'Gender' is identified as incorrect, or else it is indicated as correct.

At step 416, one or more messages based on the comparison between the extracted filled-out content and the configuration file is generated. If there is a discrepancy between the filled-out content of a field and the corresponding rule and threshold value for that field, then the device 100 may generate an error message for indicating to the customer whether the filled-out content is complete and correct. Additionally, the device 100 may generate suggestions on how to complete or correct a particular field or the filled-out content.

At step 418, the generated electronic version of the captured application form, along with the generated one or more messages, are displayed in the augmented reality mode. When the device 100 is operating in the augmented reality mode, the generated one or more messages, suggestions, etc. are superimposed on the electronic application form, both of which are displayed on the user interface 106. In some embodiments, the messages may be superimposed on the electronic application form, which is editable (editable application form). Based on the displayed messages, the customer may choose to complete and correct the physical filled-out application form or the editable application form; or simply, ignore the messages.

The present disclosure is provided in the context of methods and systems for automatic processing of forms using augmented reality. Some of the disclosed embodiments reduce the the manual effort required for checking the forms at the customer's end and thus reduces overall processing time. Some of the disclosed devices help the customer identify errors and facilitate correction of those errors. More specifically, the device may allow direct communication with the customer about the fields that are not filled-out correctly or completely. Further, the device may give control to the customer by providing options to fix entries based on error messages or ignore these error messages. Moreover, the device may maintain a log file that contains actions taken by the customer as well as error messages, which may expedite a completeness check at the customer end or at a distant location, such as at the back office.

What is claimed is:

1. A portable device for automatic processing of a marked application form, the portable device comprising:
an image capturing device having an optical lens and a microcontroller, the image capturing device configured to:
scan at least one portion of a non-electronic version of the marked application form that comprises a plurality of fields partially filled out; and
capture one or more images based on the scanning of the at least one portion of the non-electronic version of the marked application form;
a display screen configured to display a user interface and the one or more images captured by the image capturing device in the user interface; and
a processor configured to:
identify a type of the marked application form based on a comparison between the captured one or more images and a predetermined image corresponding to an original application form of the identified type;
generate an electronic version of the marked application form using the captured one or more images, wherein one or more fields of the electronic version of the marked application form are editable by a user of the portable device;
access a configuration file for the original application form of the identified type that stores information about fields of the identified type of application, the configuration file comprising a data structure specifically configured for the original application of the identified type, wherein, for a particular field of the original application, the configuration file stores:
position information for the particular field that identifies a physical location of the particular field on the identified type of application;
one or more rules for the particular field that describe dependencies between other fields of the identified application type,
two or more threshold values for the particular field, each threshold value corresponding to a pixel intensity, the two or more threshold values comprising a completeness threshold value comprising a first pixel intensity and a correctness threshold value comprising a second pixel intensity, and
one or more error messages for the particular field to be displayed when a rule for the particular field, a threshold value for the particular field, or both, is not met, the one or more error messages corresponding to a completeness error, a correctness error, or both;
extract marked content in the one or more fields of the electronic version of the marked application form;
calculate an average optical intensity of the extracted marked content;
compare the average optical intensity with the first pixel intensity to determine a presence or an absence of the completeness error;
retrieve at least one rule and the completeness threshold value from the configuration file for the particular field;
compare the extracted marked content with the at least one rule and the second pixel intensity with the average optical intensity to determine the presence or the absence of the correctness error;
generate, based on the presence of the one or more errors, the one or more error messages;
cause the display screen to display the electronic version of the marked application form such that the one or more generated error messages are superimposed on the electronic version, wherein the one or more fields of the electronic version of the marked application form are editable by the user;
receive, from the user, edits of the one or more fields of the editable electronic version of the marked application form, wherein the edits comprise an adjustment to a value of the one or more fields of the electronic version of the marked application form, and at least one of the generated error messages is based on extracted content from the one or more fields prior to the edits;
iteratively generate the one or more error messages based on comparing the edited electronic version of the marked application form with the at least one rule and the completeness threshold value and the correctness threshold value;
iteratively receive, from the user, edits of the editable electronic version of the marked application form, the iteration continuing until the edited electronic version of the marked application form received from the user does not generate an error message; and
store, when the edited electronic version of the marked application form received from the user does not generate the error message, a log file along with content from the edited electronic version of the marked application form in a database, wherein the log file indicates a validation of the stored content.

2. The portable device of claim 1, wherein at least one of the processor and the user interface is configured to enable a user to perform one or more actions on the electronic version of the marked application form.

3. The portable device of claim 1, wherein the original application form includes metadata having information about the type of the original application form and the processor is configured to identify the type based on a comparison after the captured one or more images are compared against the predetermined image corresponding to the original application form of the identified type.

4. The portable device of claim 1, wherein the processor is configured to receive the type of the marked application form from a user.

5. The portable device of claim 1, wherein the processor is configured to extract the marked content by subtracting the original application from the captured one or more images.

6. The portable device of claim 1, wherein the processor is configured to compare background information in the captured one or more images with the original application form to identify the type of the marked application form, the background information including data in the captured one or more images of the non-electronic version of the marked application form excluding the marked content.

7. The portable device of claim 1, wherein the processor is configured to identify mandatory fields and optional fields in the captured one or more images of the non-electronic version of the marked application form.

8. A method for processing a marked application form using a portable device, the method comprising:
scanning, using an image capturing device of the portable device, at least one portion of a non-electronic version of the marked application form that comprises one or more fields partially filled out, wherein the image capturing device comprises an optical lens and a microcontroller;

capturing, using the image capturing device, one or more images of the scanned at least one portion of the non-electronic version of the marked application form;

displaying, using a display screen of the portable device, a user interface and the one or more images captured by the image capturing device in the user interface;

identifying, using a processor of the portable device, a type of the marked application form based on a comparison between the captured one or more images and a predetermined image corresponding to an original application form of the identified type;

generating, using the processor, an electronic version of the marked application form using the captured one or more images of the non-electronic version of the marked application form, wherein one or more fields of the electronic version of the marked application form are editable by a user of the portable device;

accessing, using the processor, a configuration file for the original application form of the identified type that stores information about fields of the identified type of application, the configuration file comprising a data structure specifically configured for the original application of the identified type, wherein, for a particular field of the original application, the configuration file stores:

position information for the particular field that identifies a physical location of the particular field on the identified type of application;

one or more rules for the particular field that describe dependencies between other fields of the identified application type, two or more threshold values for the particular field, each threshold value corresponding to a pixel intensity, the two or more threshold values comprising a completeness threshold value comprising a first pixel intensity and a correctness threshold value comprising a second pixel intensity, and one or more error messages for the particular field to be displayed when a rule for the particular field, a threshold value for the particular field, or both, is not met, the one or more error messages corresponding to a completeness error, a correctness error, or both;

extracting, using the processor, marked content in the one or more fields of the electronic version of the marked application form;

calculating, using the processor, an average optical intensity of the extracted marked content;

comparing, using the processor, the average optical intensity with the first pixel intensity to determine a presence or an absence of the completeness error;

retrieving, using the processor, at least one rule and the completeness threshold value from the configuration file for the particular field;

comparing, using the processor, the extracted marked content with the at least one rule and the second pixel intensity with the average optical intensity to determine the presence or the absence of the correctness error;

generating, using the processor, based on the presence of the one or more errors, the one or more error messages;

displaying, using the display screen, the electronic version of the marked application form such that the one or more generated error messages are superimposed on the electronic version, wherein the one or more fields of the electronic version of the marked application form are editable by a user of the portable device;

receiving, using the processor, from the user, edits of the editable electronic version of the marked application form, wherein the edits comprise an adjustment to a value of one of the fields of the electronic version of the marked application form, and at least one of the generated error messages is based on extracted content from the one field prior to the edits;

iteratively generate the one or more error messages based on comparing the edited electronic version of the marked application form with the at least one rule and the completeness threshold value and the correctness threshold value;

iteratively receive, from the user, edits of the editable electronic version of the marked application form, the iteration continuing until the edited electronic version of the marked application form received from the user does not generate an error message; and storing, using the processor and a memory device, when the edited electronic version of the marked application form received from the user does not generate an error message, a log file along with content from the edited electronic version of the marked application form in a database, wherein the log file indicates a validation of the stored content.

9. The method of claim 8, further comprising identifying mandatory fields and optional fields in the captured one or more images of the non-electronic version of the marked application form.

10. The method of claim 8, further comprising retrieving type information of the marked application form from metadata of the original application form based on a comparison after the captured one or more images is compared against the predetermined image corresponding to the original application form of the identified type.

11. The method of claim 8, further comprising receiving the type of the marked application form from a user.

12. The method of claim 8, wherein identifying the type of the marked application form includes comparing background information in the captured one or more images with the predetermined image corresponding to the original application form of the identified type.

13. The portable device of claim 1, wherein the pixel intensity is positively correlated with a number of non-white pixels within a predetermined location for the particular field, as defined by the configuration file.

14. The method of claim 8, wherein the pixel intensity is positively correlated with a number of non-white pixels within a predetermined location for the particular field, as defined by the configuration file.

15. The portable device of claim 1, wherein a plurality of configuration files is stored for a plurality of original application types, each configuration file comprising a data structure being specifically configured for the fields of an original application type corresponding to the configuration file.

16. The method of claim 8, wherein a plurality of configuration files is stored for a plurality of original application types, each configuration file comprising a data structure being specifically configured for the fields of an original application type corresponding to the configuration file.

* * * * *